(12) United States Patent
Northedge et al.

(10) Patent No.: US 12,728,979 B2
(45) Date of Patent: Sep. 8, 2026

(54) WING ASSEMBLY

(71) Applicant: Airbus Operations Limited, Filton (GB)

(72) Inventors: Thomas Northedge, Filton (GB); John Hobday, Filton (GB)

(73) Assignee: AIRBUS OPERATIONS LIMITED, Filton (GB)

( * ) Notice: Subject to any disclaimer, the term of this patent is extended or adjusted under 35 U.S.C. 154(b) by 0 days.

(21) Appl. No.: 18/925,981

(22) Filed: Oct. 24, 2024

(65) Prior Publication Data

US 2025/0136269 A1 May 1, 2025

(30) Foreign Application Priority Data

Oct. 26, 2023 (GB) ..................................... 2316380

(51) Int. Cl.
*B64C 3/26* (2006.01)

(52) U.S. Cl.
CPC ..................................... *B64C 3/26* (2013.01)

(58) Field of Classification Search
CPC ................................. B64D 15/16; B64C 3/26
See application file for complete search history.

(56) References Cited

U.S. PATENT DOCUMENTS 2,028,669 A * 1/1936 Hiscock ................. B64D 15/16 244/134 A
5,590,854 A * 1/1997 Shatz .................. B64D 15/163 244/209
6,969,029 B2 11/2005 Crouch et al.
7,837,149 B2 11/2010 Mackin
8,192,163 B2 6/2012 Siebers et al.
2005/0141996 A1* 6/2005 Bernard ................. B64D 15/16 416/224

FOREIGN PATENT DOCUMENTS

DE 102017204975 A1 9/2018
GB 2595486 A 12/2021

OTHER PUBLICATIONS

United Kingdom Search Report for corresponding United Kingdom Patent Application No. 2316380.1 dated Mar. 1, 2024.

* cited by examiner

*Primary Examiner* — Nicholas McFall
*Assistant Examiner* — Eric Acosta
(74) *Attorney, Agent, or Firm* — Greer, Burns & Crain, Ltd.

(57) ABSTRACT

A wing assembly has a flexible cover which is movable between an extended position and a retracted position. In the extended position the flexible cover covers the leading edge of the wing assembly, thereby protecting the front of the wing assembly from impact by dirt or debris and preserving the smoothness of its surface. In the retracted position the flexible cover does not cover the leading edge of the wing assembly.

20 Claims, 5 Drawing Sheets

12
36
34
70
74
32
30
38
14
42
72
16

WING ASSEMBLY

CROSS-REFERENCES TO RELATED APPLICATIONS

This application claims the benefit of Great Britain Patent Application Number 2316380.1 filed on Oct. 26, 2023, the entire disclosure of which is incorporated herein by way of reference.

FIELD OF THE INVENTION

The present disclosure relates to the field of aircraft wings. It relates particularly, but not exclusively, to a wing assembly, a wing comprising such a wing assembly, an aircraft comprising such a wing, and a method of flying an aircraft.

FIELD OF THE INVENTION

All else being equal, it is desirable for aircraft wings operate with as little drag as possible. One way in which drag can be reduced is by arranging a wing such that airflow over the wing is in laminar flow for as long as possible. Indeed, it is particularly desirable for a wing to allow air flowing over it to remain in laminar flow across the entire wing, as this can provide a reduction in drag of around 7% to 8%.

Many different variables have an effect on the ability for air to stay in laminar flow while passing over a wing, but one of these is the surface roughness of the wing. For air to remain in laminar flow the surface of the wing must be sufficiently smooth. Even if the surface of a wing is manufactured with sufficiently low surface roughness, the roughness can be increased during use. For example, dirt and debris can impact the wing, causing microscopic dents or chips which permanently increase surface roughness through erosion. Instead or as well, dirt and debris impacting the wing can adhere to it, building up on the wing and increasing its surface roughness until the wing can be cleaned.

Arrangements for cleaning wings do exist. For instance, it is known to provide a wing with a wiper which moves spanwise along the front of the wing, scraping debris therefrom. As another example, it is known to provide a wing with an elastic cover which can be stretched so as to loosen debris build-up. However, there are numerous problems with known designs. For instance, wings with wiper arrangements are not protected from microscopic chipping/denting, and it can be difficult for them to reliably clean a wing to the extent required for laminar flow. Equally, stretching elastic coverings is not always successful at removing dirt/debris adhered thereto, and the coverings can be as prone to (or even more prone to) microscopic damage from debris. Instead or as well, known arrangements are often heavy, complex, prone to failure and/or in need of particularly stringent maintenance or replacement of consumables.

The present invention seeks to mitigate one or more of the above-mentioned problems. Alternatively or additionally, the present invention seeks to provide an improved or alternative wing assembly, aircraft wing, aircraft or method of flying an aircraft.

SUMMARY OF THE INVENTION

According to a first aspect of the present invention there is provided a wing assembly which extends along a spanwise direction and defines a leading edge and a trailing edge, the wing assembly comprising a flexible cover which is movable between an extended position in which it covers the leading edge of the wing assembly, and a retracted position in which it does not cover the leading edge of the wing assembly.

By covering the leading edge of the wing assembly, rather than wiping it, the leading edge can be protected from erosion from impacts with dirt/debris, as well as build-up of such dirt/debris on the wing assembly. Also, dirt/debris can build up on the cover, rather than building up on the leading edge and then needing to be thoroughly cleaned off. This approach can be more reliable, lighter, cheaper and/or lower maintenance in comparison to arrangements where dirt/debris is wiped off. Furthermore, with the flexible cover being retractable it may not be necessary for dirt/debris to be removed therefrom during flight, in contrast to arrangements using elastic coverings. Also, the flexible cover not necessarily needing to be elastic may allow it to be stronger and less vulnerable to damage from dirt/debris.

Where further definition is considered necessary, despite the understanding of the skilled person, a cover may be considered to be flexible if it is capable of deforming significantly under its own weight.

In the extended position, the flexible cover may cover the leading edge and a region at least 2 cm (for instance at least 5 cm, at least 10 cm, at least 20 cm or at least 30 cm) wide which extends above and/or below the leading edge. This may advantageously increase the amount of protection provided by the flexible screen.

For example, in the extended position the flexible cover may extend downward and rearward past the leading edge by at least 2 cm, for instance at least 5 cm, at least 10 cm, at least 20 cm or at least 30 cm. Instead or as well, in the extended position the flexible cover may extend upward and rearward past the leading edge by at least 2 cm, at least 5 cm, at least 10 cm, at least 20 cm or at least 30 cm.

In the extended position, the flexible cover may cover the front 5% (for instance the front 10%, the front 20% or the front 25%) of the wing assembly in the chordwise direction. This may advantageously increase the amount of protection provided by the flexible screen.

The flexible cover may cover substantially all a front-facing surface of the wing assembly.

For the avoidance of doubt, the term "wing assembly" should be understood to be an assembly which forms part of a wing, not an assembly including an entire wing.

Reference herein to the flexible cover not covering the leading edge when in the retracted position is not intended to exclude the possibility of a portion of the leading edge being obscured by a component other than the flexible cover. That being said, with the flexible cover in the retracted position (such that the flexible cover does not cover the leading edge of the wing assembly) the leading edge of the wing assembly may be entirely or substantially entirely exposed to airflow passing over the wing.

The leading edge of the wing assembly may be provided in a front region of the wing assembly which is substantially contiguous (i.e. devoid of gaps or holes through which air can pass). The substantially contiguous front region may extend upwards from the leading edge, for instance providing a substantially contiguous upper region of the wing assembly.

The flexible cover may be arranged to substantially or entirely prevent the flow of air therethrough. For instance, the flexible cover may be substantially or entirely devoid of holes, gaps or cutouts therethrough.

In the extended position the flexible cover may lie on top of an outer surface of the wing assembly in contact therewith, and conform to the shape of said outer surface.

This can reduce the effect that the position of the flexible cover has on the aerodynamics of the wing assembly during flight. Instead or as well, it may reduce the risk of air flowing between the flexible cover and the leading edge, which could cause introduce dirt/debris to the leading edge of the wing assembly and/or move the flexible cover out of the required position.

For the avoidance of doubt, reference to the flexible cover lying on top of the outer surface is intended to refer to the flexible cover being positioned outward of the outer surface, rather than necessarily being vertically above it.

As an alternative, the flexible cover may be held spaced apart from the outer surface in one or more areas, for instance by a support structure.

The flexible cover may be formed from a fabric.

This may allow the flexible cover to be advantageously light, cheap and/or quick to produce.

As an alternative, the flexible cover may be formed from a series of movably-interconnected rigid elements.

Said fabric may be woven carbon fiber.

This may give the flexible cover advantageous strength and/or robustness. Instead or as well, it may reduce the extend to which the flexible cover deforms under load due to Poisson's ratio.

As some alternatives, the fabric may be another woven material such as aramid, UHMWPE, polyethylene or metallic fiber, or the fabric may be a continuous layer of one or more materials such as metallic foil or polymer sheeting.

The flexible cover may have a front region positioned to pass across the leading edge of the wing assembly as the flexible cover is moved between the extended and retracted positions, the front portion having a rigid support member.

This may improve the mechanical stability of the flexible cover during flight, for instance during movement of the flexible cover from the retracted position to the extended position. Instead or as well, the rigid support member may provide a mounting point for other components (such as parts of a drive mechanism, or features to prevent the flexible cover from lifting off the wing assembly).

Where further definition is considered necessary, despite the understanding of the skilled person, a support member may be considered to be rigid if it does not significantly deform under its own weight.

As an alternative, the flexible cover may be substantially entirely flexible, or may have other rigid components (for instance stiffening members at one or more locations away from the front region).

The wing assembly may further comprise a drive mechanism configured to move the flexible cover between the extended and retracted positions.

The drive mechanism may comprise one or more actuators such as electric or hydraulic motors, hydraulic cylinders, solenoids or electric linear actuators.

The drive mechanism may include a cable arranged to pull the flexible cover away from the retracted position and towards the extended position.

The use of a cable may allow the drive mechanism to be advantageously compact, lightweight, easy to inspect and/or easy to maintain.

The drive mechanism may include a spool around which the flexible screen is wound when the flexible screen is in the retracted position.

The use of a spool may allow the drive mechanism to be advantageously compact, lightweight, easy to inspect and/or easy to maintain.

The spool may be drivable to rotate so as to pull the flexible screen onto the spool and thereby move the flexible cover away from the extended position and towards the retracted position.

For instance, the spool may be drivable by a hydraulic motor, an electric motor or a biasing member such as a spring.

The wing assembly may further comprise a track extending along an outer surface of the wing assembly past the leading edge, and the flexible cover may comprise a runner, the runner being arranged to run along the track as the flexible cover moves between the extended and retracted positions.

The track may guide movement of the flexible cover, thereby making it more stable. Instead or as well, the track may hold the flexible cover in place over the outer surface of the wing assembly.

The track may be recessed beneath the outer surface of the wing assembly, for example, or may be positioned proud of the outer surface of the wing assembly.

Part of the flexible cover may be recessed within the wing assembly when the flexible cover is in the extended position.

This may reduce the impact of the flexible cover on the aerodynamics of the wing assembly when extended, for instance by avoiding an end or edge of the flexible cover acting as an obstruction to air passing over the wing and causing turbulence or drag.

As an alternative, the entire flexible cover may be proud of the outer surface of the wing assembly when in the extended position.

Where the flexible cover lies on top of an outer surface of the wing assembly and the wing assembly comprises a track extending along an outer surface of the wing assembly, said outer surfaces may be the same outer surface or different outer surfaces.

At least part of the flexible cover may be recessed within the wing assembly when the flexible cover is in the retracted position.

This may reduce the impact of the flexible cover on the aerodynamics of the wing assembly when retracted, for instance by avoiding an end or edge of the flexible cover acting as an obstruction to air passing over the wing and causing turbulence or drag. Indeed, substantially all the flexible cover may be recessed within the wing assembly when in the retracted position.

As an alternative, the entire flexible cover may be proud of the outer surface of the wing assembly when in the extended position. For instance, in the retracted position the flexible cover may lie flat on top of an underside or top side of the wing assembly.

The wing assembly may have an aperture in an outer surface thereof, the flexible cover being arranged to move through the aperture when moving between the extended and retracted positions.

Such an aperture may physically support the flexible cover during extension/retraction, thereby making its movement more stable and/or reducing the risk of it being blown out of position by air flow passing over the wing assembly. Instead or as well, the aperture may provide an advantageously cheap, simple and/or compact way for portions of the flexible cover to move into or out a recessed position within the wing assembly.

Where the wing assembly has an aperture in an outer surface, and the flexible cover lies on top of an outer surface of the wing assembly and/or the wing assembly comprises a track extending along an outer surface of the wing assembly, said outer surfaces may be the same outer surface or different outer surfaces.

The aperture may be closable.

This may reduce the impact of the aperture on the aerodynamics of the wing assembly when it is not required for the aperture to be open.

As an alternative, the aperture may be permanently open and may for instance be positioned in an area of the wing assembly where its effect on air flow is minimized.

The leading edge may be provided on a slat of the wing assembly and the trailing edge may be provided on a main body of the wing assembly, the slat being movable relative to the main body.

The slat may carry part of, or all of, the flexible cover.

In the extended position the flexible cover may cover substantially all a front-facing surface of the slat.

Where part of the flexible cover is recessed within the wing assembly as described above, at least some of said part of the flexible cover may be recessed by virtue of being positioned in a gap between the slat and the main body.

The gap may therefore function as an aperture as described above, without requiring a separate aperture to be provided (which may place unwanted design constraints on the wing assembly).

The wing assembly may further comprise a cover cleaning member, wherein the flexible cover is positioned to run over the cleaning member in contact therewith during movement of the flexible cover between the extended and retracted positions.

This may allow the flexible cover to be cleaned as an automatic result of moving it between positions, thereby reducing or eliminating the need for cleaning of the cover on the ground after use.

The cover cleaning member is preferably positioned to contact an outer surface of the flexible cover.

The flexible cover may further comprise an ice scraper positioned to run over an outer surface of the wing assembly during movement of the flexible cover between the extended and retracted positions.

This may allow the movement of the flexible cover to provide or assist with clearing ice buildup from the wing assembly. This may allow ice clearance to result automatically from movement of the flexible cover from the retracted position to the stowed position (as may take place while descending from high altitude, with ice formation generally being associated with higher altitudes). Instead or as well, it may reduce or eliminate the need for a separate ice removal system to be provided.

The flexible cover may be provided as a plurality of sections distributed along the wing assembly in the spanwise direction.

This may allow the flexible cover to be larger than could be conveniently produced as a single piece, and/or may allow the flexible cover to follow a relatively complex shape of wing assembly without itself being overly complex in shape. Instead or as well, it may allow individual sections to be serviced or replaced as needed, rather than the entire screen having to be serviced/replaced in the event of a localized fault. Instead or as well, one or more gaps may be provided between sections, which gaps may accommodate components which should not be covered (for instance lights or instrumentation).

According to a second aspect of the present invention there is provided a wing assembly having a length in a span direction, a front edge and a rear edge, wherein the wing assembly has a pliable screen which is deployable to a configuration in which the pliable screen overlies the front edge of the wing assembly, and stowable to a configuration in which the pliable screen does not overlie the front edge of the wing assembly.

Such a wing assembly may provide one or more of the advantages discussed above in relation to the first aspect of the invention.

According to a third aspect of the present invention there is provided an aircraft wing comprising a wing assembly according to the first or second aspect of the invention, the leading edge of the wing assembly forming at least part of a leading edge of the wing.

Such an aircraft wing may provide one or more of the advantages discussed above.

According to a fourth aspect of the present invention there is provided an aircraft comprising an aircraft wing according to the third aspect of the invention.

Such an aircraft may provide one or more of the advantages discussed above.

According to a fifth aspect of the present invention there is provided a method of flying an aircraft, the method comprising:

providing an aircraft with a wing which has a flexible cover;

with the flexible cover in an extended position in which it covers a leading edge of the wing, ascending the aircraft to a first threshold altitude; then moving the flexible cover to a retracted position in which it does not cover the leading edge of the wing, then flying at or above the first threshold altitude with the flexible cover in the retracted position.

Having the flexible cover in the extended position when ascending to the first threshold altitude, and having the flexible cover in the retracted position above that altitude, can allow the wing to be tailored to the conditions it is likely to experience. Namely, the wing can be protected from dirt/debris at altitudes where such dirt/debris is prevalent, and can be exposed to air flow at altitudes where dirt/debris is much sparser and where low surface roughness of the leading edge can improve the flow of air over the wing.

The first threshold altitude may be more than 500 feet, for instance more than 700 feet or more than 900 feet. The first threshold altitude may be less than 3000 feet, for instance less than 2500 feet, less than 2000 feet or less than 1500 feet. Such a threshold may represent the point at which the chances of erosion or buildup of dirt/debris are sufficiently low for it to be unnecessary to protect the leading edge.

The method may further comprise taking off with the flexible cover in the extended position before ascending to the threshold altitude.

The method may further comprise:

with the flexible cover in the retracted position, descending to a second threshold altitude; then moving the flexible cover to the extended position, then flying at or below the second threshold altitude with the flexible cover in the extended position.

The second threshold altitude may be more than 500 feet, for instance more than 700 feet or more than 900 feet. The first threshold altitude may be less than 3000 feet, for instance less than 2500 feet, less than 2000 feet or less than 1500 feet. Such a threshold may represent the point at which the chances of erosion or buildup of dirt/debris are sufficiently high for it to be advisable to protect the leading edge.

The method may further comprise landing with the flexible cover in the extended position after flying at or below the second threshold altitude.

The first threshold altitude and the second threshold altitude may be substantially (i.e., +/−10%) the same.

As an alternative, the first and second threshold altitudes may be at least 100 feet, for instance at least 200 feet, at least 300 feet or at least 400 feet, apart. For example, the second threshold may be a lower altitude since build-up of dirt/debris may be more tolerable when the aircraft is approaching landing (and thus will be able to be cleaned) than when it is ascending to cruising altitude (whereupon dirt/debris buildup could have an immediate negative effect on aerodynamic performance.

It will of course be appreciated that features described in relation to one aspect of the present invention may be incorporated into other aspects of the present invention. For example, a method according to the invention may incorporate any of the features described with reference to apparatus of the invention and vice versa. Further, it is to be noted that methods described herein are not intended to be limited to the steps of those methods being performed in the order in which they are recited. It would be readily apparent to the skilled person where steps can, or cannot, be performed in a different order.

BRIEF DESCRIPTION OF THE DRAWINGS

Embodiments of the present invention will now be described by way of example only with reference to the accompanying schematic drawings of which.

DETAILED DESCRIPTION OF THE PREFERRED EMBODIMENTS

Figure 1:
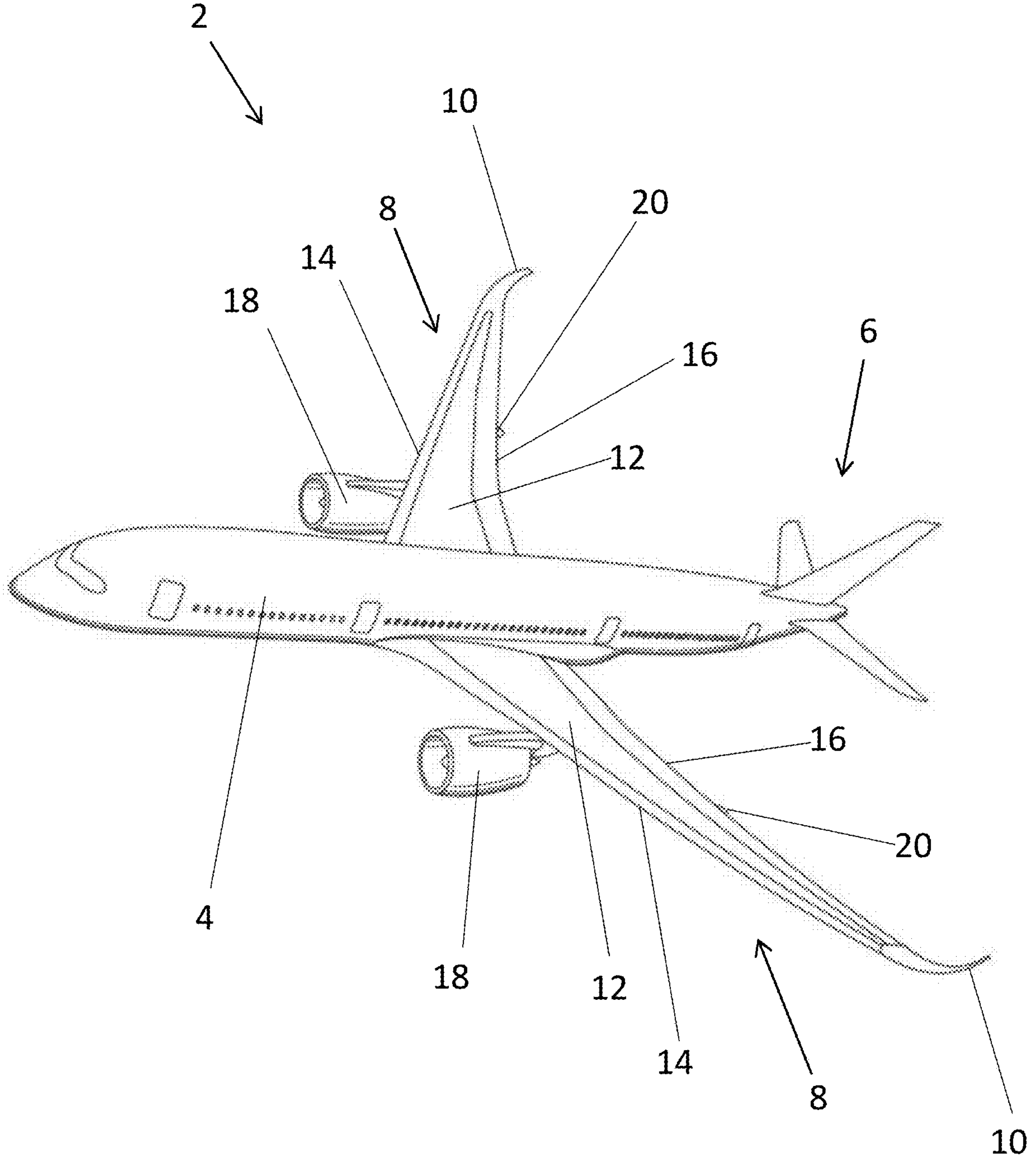
FIG. 1 shows a perspective view of an aircraft according to a first embodiment of the invention.

FIG. 1 shows an aircraft 2 according to an embodiment of the invention. It has a body 4, a tail 6 and two wings 8. Each wing 8 extends from the body 4 in a spanwise direction and terminates in an upturned wing tip 10. Each wing 8 comprises a wing assembly 12 which defines a leading edge 14 and a trailing edge 16 of the wing. The wing assembly 12 of each wing supports an engine 18, a fairing 20 (the very rear portion of which is visible in FIG. 1) and the wing tip 10. The body 4, tail 6, wing tips 10, engines 18 and fairings 20 are not material to the present invention, so will not be described in detail.

Figure 2:
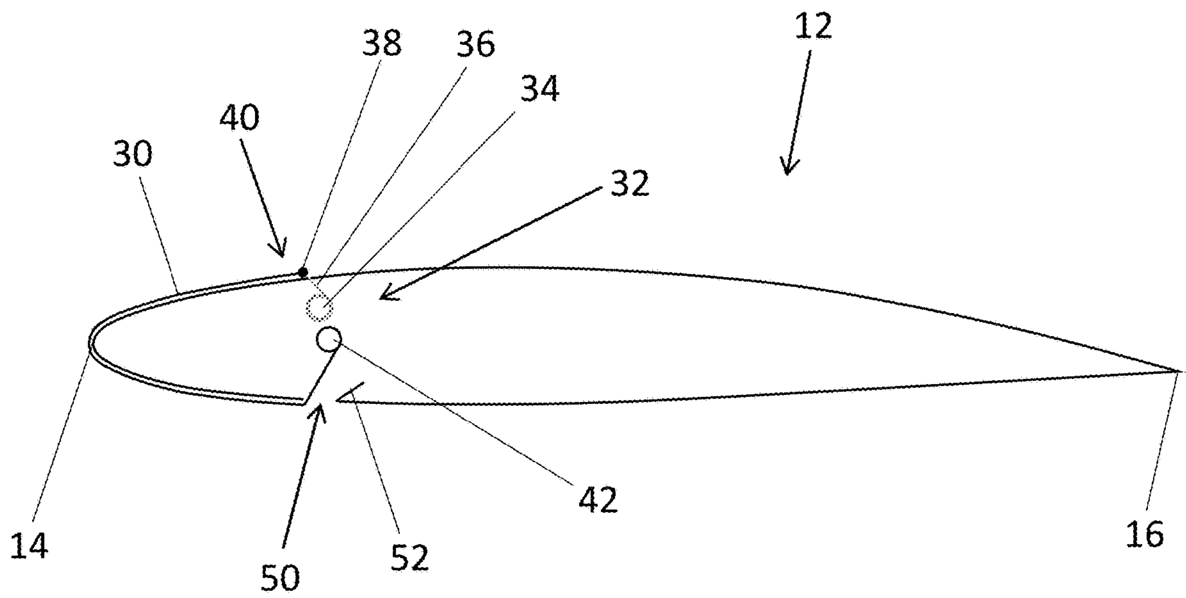
FIG. 2 shows a schematic cross section of a wing of the aircraft of FIG. 1, with a flexible cover in an extended position.
Figure 3:
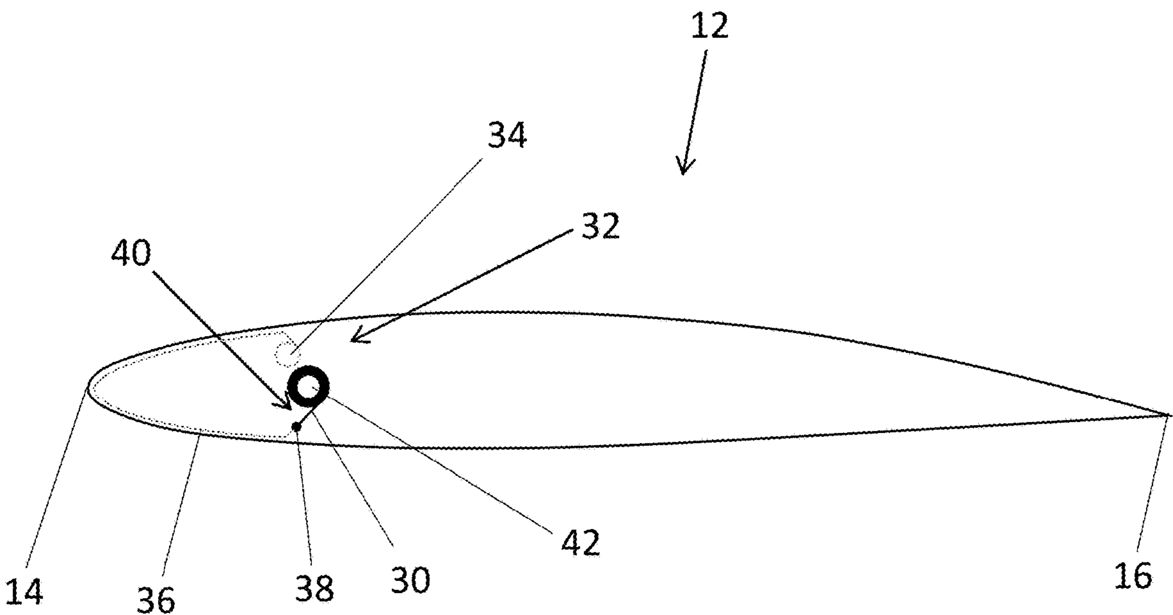
FIG. 3 shows a schematic cross section of the wing of FIG. 2, with the flexible cover in a retracted position.

The structure of one of the wings 8 will now be described with reference to FIG. 1 in combination with FIGS. 2 to 4, which show a cross section of one of the wings 8, taken normal to the spanwise direction through the wing assembly 12. The two wings 8 are mirror images of one another, therefore the discussion below is equally applicable to either wing 8.

The wing assembly 12 has a flexible cover 30 (or screen) which in this embodiment is formed from a sheet of woven carbon fiber fabric. The flexible cover 30 is movable between an extended position (as shown in FIGS. 2 and 4) and a retracted position (as shown in FIG. 3). In the extended position the flexible cover 30 covers the leading edge 14 of the wing assembly 12 (and thus of the wing 8). More particularly, in this position the flexible cover 30 lies on top of the outer surface of the wing assembly 12 in contact therewith (FIGS. 2 and 4 show a gap for the sake of clarity), conforming to the shape of the outer surface. In the retracted position the flexible cover 30 does not cover the leading edge 14. Rather, with the flexible cover 30 in the retracted position the leading edge is uncovered, and can be acted on by air flowing over the wing 8 in conventional fashion.

The wing assembly 12 has a drive mechanism 32 for moving the flexible cover 30 between the extended and retracted positions. The drive mechanism 32 has a winch drum 34, a set of cables 36 (one of which is visible in FIGS. 2 and 3) each of which extends between the winch drum 34 and a rigid support member 38 provided at a front portion 40 of the flexible cover 30, and a spool 42 arranged to receive part of the flexible cover 30. With the flexible cover 30 in the extended position the majority of the length of the cables is taken up on the winch drum 34, while the majority of the flexible cover 30 extends over the surface of the wing 8. With the flexible cover 30 in the retracted position the majority of the length of each cable 36 extends around the front of the wing 8, recessed beneath the outer surface of the wing in a respective track (not shown), while the majority of the flexible cover 30 is received around the spool 42.

The winch drum 34 and cables 36 of the drive mechanism 32 are configured to move the flexible cover 30 from the retracted position to the extended position. The drum 34 is drivable by a hydraulic or electric motor (not visible), causing the drum 34 to take up the cables 36 and pull the front portion 40 of the flexible cover 30 round the front of the wing 8 (clockwise from the perspective of FIGS. 2 to 4) and past the leading edge 14, unwinding the flexible cover 30 from the spool 42 as it moves.

It is noteworthy that in this embodiment all of the flexible cover 30 is recessed within the wing assembly 12 when in the retracted position. More particularly, in the retracted position all of the flexible cover 30 aside from the front portion 40 is recessed within the wing assembly 12 and is wrapped around the spool 42, and while the front portion 40 of the flexible cover 30 extends outward from the spool 42 it is nonetheless recessed within the wing assembly.

It is also noteworthy that part of the flexible cover 30 is recessed within the wing assembly 12 when in the extended position. Whilst most of the flexible cover 30 overlies the outer surface of the wing assembly 12 when in this position, an end of the flexible cover opposite to the front portion 40 remains wrapped around the spool 42 or in proximity thereto.

The spool 42 of the drive mechanism 32 is configured to move the flexible cover 30 from the extended position to the retracted position. The spool 42 is biased to rotate (anti-clockwise from the perspective of FIGS. 2 to 4) by a torsion spring (not visible). Thus, when permitted by a brake mechanism (not visible) on the winch drum 34, the spool 42 takes up the flexible cover 30, pulling the flexible cover 30 off the front of the wing assembly 12 and pulling the front portion 40 of the flexible cover 30 back past the leading edge 14. The front portion 40 of the flexible cover 30, in turn, pulls the cables 36 out from the winch drum 34 and around the front of the wing assembly 12 through their respective tracks (not shown).

In the present embodiment the wing assembly 12 has an aperture 50 in a lower surface thereof. The flexible cover 30 is arranged to move through the aperture 50 as it moves between the extended and retracted positions. The aperture 50 is selectively closable using a pivotable door 52. The door 52 can be opened to open the aperture 50 and allow the flexible cover 30 to pass therethrough (for instance when the flexible cover is in the extended position or moving between positions), and closed to close the aperture 50 (for instance when the flexible cover 30 is in the retracted position). With the door 52 closed to close the aperture 50, a narrow gap or a set of small holes remain through which the cables 36 can pass.

Figure 4:
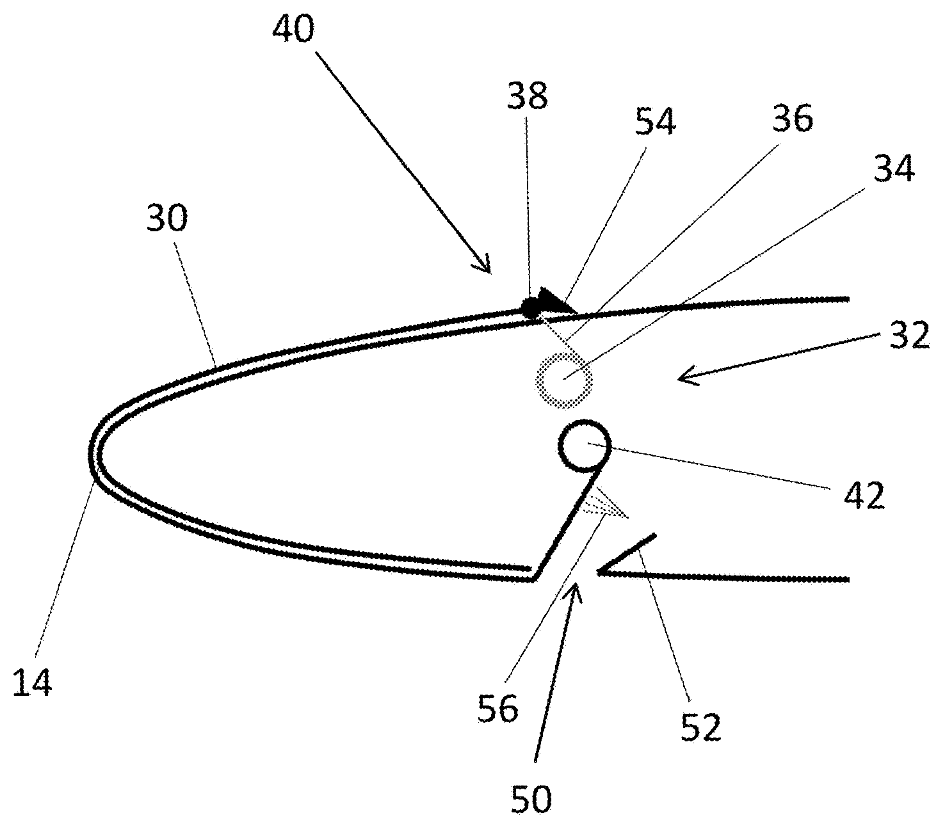
FIG. 4 shows an enlargement of part of FIG. 1.

As shown in FIG. 4, the front portion 40 of the flexible cover 30 includes an ice scraper 54. The ice scraper 54 is positioned to contact the outer surface of the wing assembly 12 when the flexible cover 30 is moving from the retracted position to the extended position, allowing it to scrape any ice buildup off the outer surface of the wing assembly 12 as it passes.

FIG. 4 also shows a cover cleaning member 56 in the form of a stiff-bristled brush positioned generally above the aperture 50, in contact with the outward-facing surface of the flexible cover 30. The cover cleaning member 56 is positioned such that the flexible cover 30 runs over it as it moves from the extended position to the retracted position (and indeed from the retracted position to the extended position).

Figure 5:
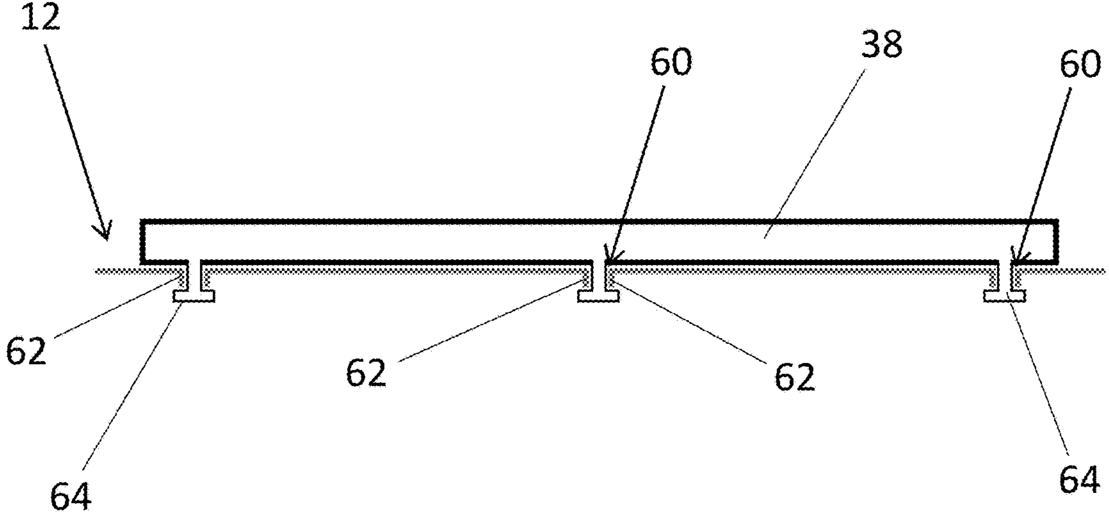
FIG. 5 shows a schematic cross sectional front view of the top of the wing and the flexible cover of FIGS. 2 and 3.

FIG. 5 shows the front portion 40 of the flexible cover 30, and a portion of the wing assembly 12, from the front. From this perspective the tracks 60 which receive respective cables 36 are visible. Referring now to FIG. 5 in combination with FIGS. 1 to 4, the wing assembly 12 has a set of three tracks 60 which each extend along the outer surface of the wing assembly 12, along the front of the wing assembly and past the leading edge 14. Each track is formed by a slot in the outer surface of the wing assembly 12, between two downwardly-projecting lips 62.

In this embodiment the tracks 60 serve another function as well as receiving the cables 36. The front portion 40 of the flexible cover 30 has a set of three runners 64, each runner being received in a corresponding track 60. The runners 64 are arranged to run along their respective tracks 60 during movement of the flexible cover 30 between the extended and retracted positions. The tracks 60 guide the runners 64 and thus guide movement of the flexible cover 30, and also act to hold the flexible cover 30 against the outer surface of the wing assembly so as to prevent it flapping or lifting under the influence of air passing over the wing 8.

Figure 6:
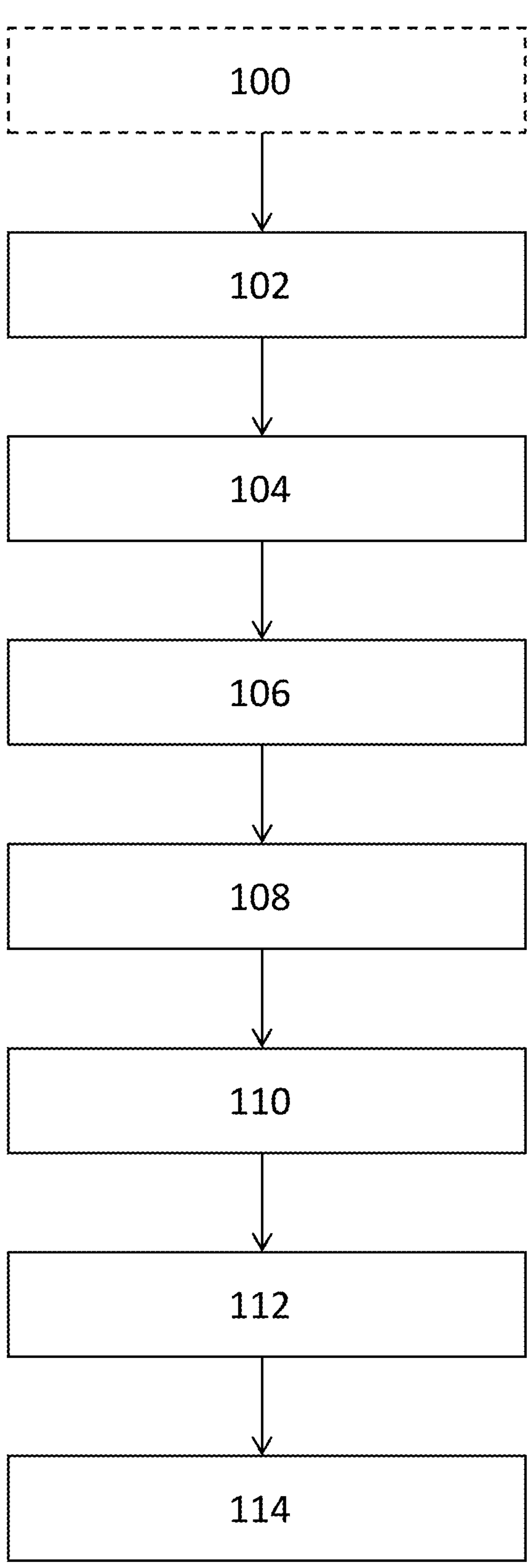
FIG. 6 shows a flow chart of a method according to the first embodiment of the invention.

A method of flying an aircraft 2 according to the first embodiment will now be described, with reference to FIG. 6 in combination with FIGS. 1 to 5.

With the aircraft 2 ready to depart, in step 100 the flexible cover 30 of each wing is moved to the extended position (if not already in that position). The aircraft then takes off in step 102 and begins to climb in step 104. During this time, the flexible cover 30 of each wing 8 covers its leading edge 14, and indeed the entire front region of the wing 8. Thus, any dirt or debris encountered by the front of the wing 8 impacts the flexible cover 30. Any damage or buildup caused by that dirt/debris thus affects the flexible cover 30, leaving the surface roughness of the wing 8 unaltered.

One the aircraft 2 has climbed to a threshold altitude of 1000 feet, dirt/debris is much less prevalent in the air, thus the risk of further damage or buildup is minimal. Accordingly, as the aircraft 2 passes this threshold the flexible cover 30 is moved to the retracted position in step 106. The spool 42 rotates under action of its spring (not visible) pulling the flexible cover 30 through the aperture 50 and onto the spool. As the flexible cover 30 is retracted, it is pulled across the cover cleaning member 56, which scrapes off any dirt/debris adhered thereto. Also as the flexible cover 30 is retracted, it pulls the cables 36 out from the winch drum 34, through the tracks 60 around the front of the wing 8 and towards the aperture.

Once the flexible cover 30 is fully retracted, the door 52 is closed to close the aperture 50, thereby reducing the aerodynamic impact of the aperture 50. With the flexible cover retracted, the (clean, undamaged) outer surface of the wing assembly 12 at the leading edge 14 is presented to the airflow. The surface roughness of the wing 8 is thus low enough for air passing over the wing to remain in laminar flow. The aircraft 2 then continues to fly above the threshold altitude in step 108, with beneficially reduced drag (and thus reduced fuel consumption).

Once the aircraft 2 nears its destination, in step 110 it descends. Once the aircraft reaches a threshold altitude which in this specific example is again 1000 feet, the risk of dirt/debris impacting the wing 8 starts to become significant. The flexible cover 30 is therefore extended again in step 112. The door 52 opens to open the aperture 50, and the winch drum 34 rotates so as to pull on the cables 36. The flexible cover 30 is therefore pulled back through the aperture 50, over the front of the wing 8 and over the leading edge 14. As the front portion 40 of the flexible cover 30 passes over the outer surface of the wing, the ice scraper 54 scrapes any ice off the outer surface of the wing 8 (in this case with the assistance of a conventional de-icing system) before it is covered by the flexible cover 30. With the flexible cover 30 in the extended position, the door 52 is closed.

With the leading edge 14 of the wing 8 covered, in step 114 the aircraft continues to fly while descending further and in step 116 the aircraft comes in to land. During this time, any dirt/debris in the air impacts the flexible cover 30. After landing, the flexible covers 30 may be inspected, serviced and/or replaced.

A wing assembly according to a second embodiment of the invention will now be described with reference to FIGS. 7 and 8, in combination with FIGS. 1 to 5. The second embodiment is similar to the first embodiment therefore only the differences will be described in detail. Corresponding reference numerals denote corresponding features.

Figures 7, 8:
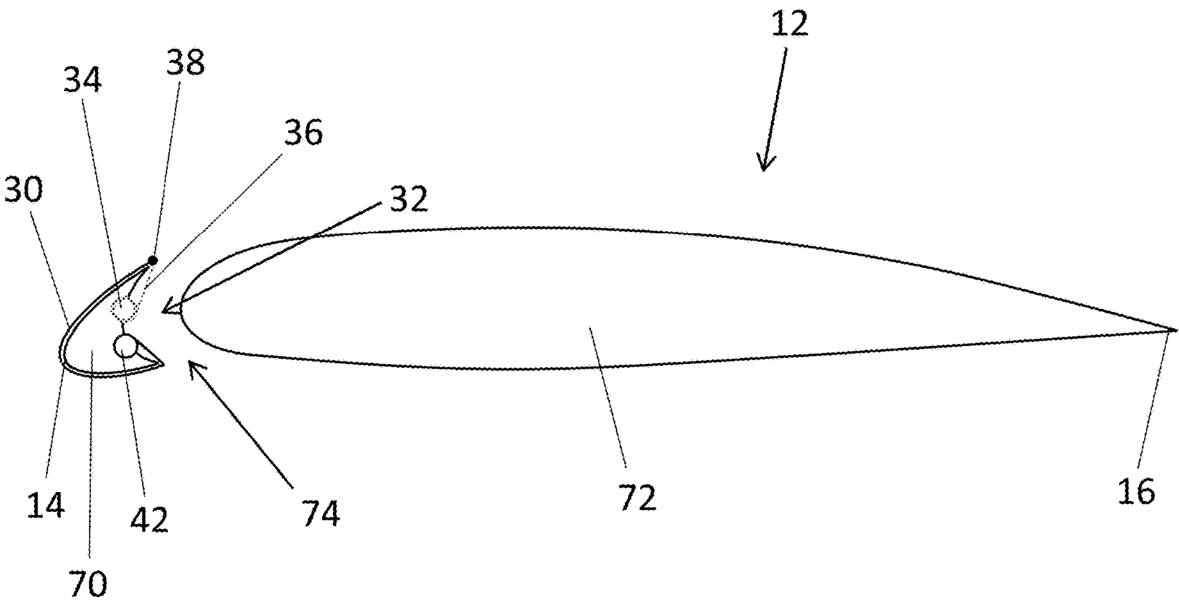
FIG. 7 shows a schematic cross section of a wing according to a second embodiment of the invention with a flexible cover in an extended position and a slat in a high lift position.
FIG. 8 shows a schematic cross section of the wing of FIG. 7, with the flexible cover in a retracted position and the slat in a low drag position.

Like the first embodiment, the wing assembly 12 of the second embodiment has a flexible cover 30 which is movable between an extended position (as shown in FIG. 7) and a retracted position (as shown in FIG. 8). However, in the wing assembly 12 of the second embodiment the flexible cover 30 is carried by a slat 70 which is movable relative to a main body 72. The slat 70 defines the leading edge 14, while the main body 72 defines the trailing edge 16. The slat 70 is movable between a high lift position (as shown in FIG. 7) and a low drag position (as shown in FIG. 8). In the high lift position the slat 70 is positioned further forwards and rotated downwards so as to increase the chord length and increase the angle of attack, whereas in the low drag position the slat 70 is positioned further rearwards and rotated in line with the main body 72 so as to reduce drag, in known fashion.

In conventional wings the slat is generally placed in the high lift position at lower altitudes for takeoff and landing, and in the low drag position for high altitude cruising. Equally, as discussed above the problem of dirt/debris exists mainly at low altitudes. Thus, in the present embodiment there may be correlation between when the slat 70 is in the high lift position and when the flexible cover 30 is in the extended position. However, in the present embodiment the movement of the slat and the movement of the flexible cover 30 can be performed independently of one another.

As with the first embodiment, in the second embodiment part of the flexible cover 30 is recessed within the wing assembly 12 when the flexible cover is in the extended position, and part of the flexible cover 30 is recessed within the wing assembly 12 when the flexible cover is in the retracted position. In the present embodiment, however, portions of those parts are recessed due to their being positioned in a gap 74 between the slat 70 and the main body 72. More particularly, with the flexible cover 30 in the retracted position most of it is recessed by virtue of being on the spool 42, which is received within the slat. However, the front portion 40 of the flexible cover 30 extends away from the spool 42 and is recessed by virtue of being positioned in the gap 74. Equally, with the flexible cover 30 in the extended position, the portion thereof which extends away from the spool (but is not positioned on top of the outer surface of the wing assembly 12) is recessed due to it being located in the gap 74. Due to the presence of the gap 74, the wing assembly 12 of this embodiment is not provided with a separate aperture. Rather, the gap 74 fulfils the function of the aperture of the first embodiment.

The second embodiment also differs from the first embodiment in that the flexible cover 30 is provided as a set of three sections (one of which is visible in FIGS. 7 and 8), positioned next to one another along the spanwise length of the wing assembly 12. In this specific embodiment the three sections are movable together using a common drive mechanism 32.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing assembly which extends along a spanwise direction and defines a leading edge and a trailing edge, the wing assembly comprising:

a flexible cover movable between an extended position in which the flexible cover covers the leading edge of the wing assembly, and a retracted position in which the flexible cover does not cover the leading edge of the wing assembly.

2. The wing assembly according to claim 1 wherein in the extended position the flexible cover lies on top of an outer surface of the wing assembly in contact therewith and conforms to a shape of said outer surface.

3. The wing assembly according to claim 1, wherein the flexible cover is formed from a fabric.

4. The wing assembly according to claim 3, wherein the fabric is woven carbon fiber.

5. The wing assembly according to claim 1, wherein the flexible cover comprises a front region positioned to pass across the leading edge of the wing assembly as the flexible cover is moved between the extended position and the retracted position, the front region having a rigid support member.

6. The wing assembly according to claim 1, further comprising:

a drive mechanism configured to move the flexible cover between the extended position and the retracted position.

7. The wing assembly according to claim 6, wherein the drive mechanism comprises a cable configured to pull the flexible cover away from the retracted position and towards the extended position.

8. The wing assembly according to claim 6, wherein the drive mechanism comprises a spool around which the flexible cover is wound when the flexible cover is in the retracted position.

9. The wing assembly according to claim 8, wherein the spool is configured to be driven to rotate so as to pull the flexible cover onto the spool and thereby move the flexible cover away from the extended position and towards the retracted position.

10. The wing assembly according to claim 1, wherein part of the flexible cover is recessed within the wing assembly when the flexible cover is in the extended position, or, wherein at least part of the flexible cover is recessed within the wing assembly when the flexible cover is in the retracted position, or both.

11. The wing assembly according to claim 10, wherein the wing assembly has an aperture in an outer surface thereof, and wherein the flexible cover is configured to move through the aperture when moving between the extended position and the retracted position.

12. The wing assembly according to claim 1, wherein the leading edge is provided on a slat of the wing assembly, and, wherein the trailing edge is provided on a main body of the wing assembly, the slat being movable relative to the main body.

13. The wing assembly according to claim 12, wherein part of the flexible cover is recessed within the wing assembly when the flexible cover is in the extended position or part of the flexible cover is recessed within the wing assembly when the flexible cover is in the retracted position, and wherein at least some of said part of the flexible cover is recessed by virtue of being positioned in a gap between the slat and the main body.

14. The wing assembly according to claim 1, further comprising:

a cover cleaning member, wherein the flexible cover is positioned to run over the cleaning member in contact therewith during movement of the flexible cover between the extended position and the retracted position.

15. The wing assembly according to claim 1, wherein the flexible cover further comprises an ice scraper positioned to run over an outer surface of the wing assembly during movement of the flexible cover between the extended position and the retracted position.

16. The wing assembly according to claim 1, wherein the flexible cover is provided as a plurality of sections distributed along the wing assembly in the spanwise direction.

17. An aircraft comprising:

a wing having the wing assembly according claim 1, the leading edge of the wing assembly forming at least part of a leading edge of the wing.

18. A wing assembly which extends along a spanwise direction and defines a leading edge and a trailing edge, the wing assembly comprising:

a flexible cover movable between an extended position in which the flexible cover covers the leading edge of the wing assembly, and a retracted position in which the flexible cover does not cover the leading edge of the wing assembly; and a track extending along an outer surface of the wing assembly past the leading edge, wherein the flexible cover comprises a runner, the runner arranged to run along the track as the flexible cover moves between the extended position and the retracted position.

19. A wing assembly which extends along a spanwise direction and defines a leading edge and a trailing edge, the wing assembly comprising:

a flexible cover movable between an extended position in which the flexible cover covers the leading edge of the wing assembly, and a retracted position in which the flexible cover does not cover the leading edge of the wing assembly, wherein part of the flexible cover is recessed within the wing assembly when the flexible cover is in the extended position, or wherein at least part of the flexible cover is recessed within the wing assembly when the flexible cover is in the retracted position, or both, wherein the flexible cover is configured to move through the aperture when moving between the extended position and the retracted position, and wherein the aperture is configured to close.

20. A wing assembly having a length in a span direction, a front edge, and a rear edge, wherein the wing assembly comprising:

a pliable screen which is configured to be deployed into a configuration in which the pliable screen overlies the front edge of the wing assembly, and configured to be stowed in a configuration in which the pliable screen does not overlie the front edge of the wing assembly.

* * * * *